United States Patent Office 3,198,089
Patented Aug. 3, 1965

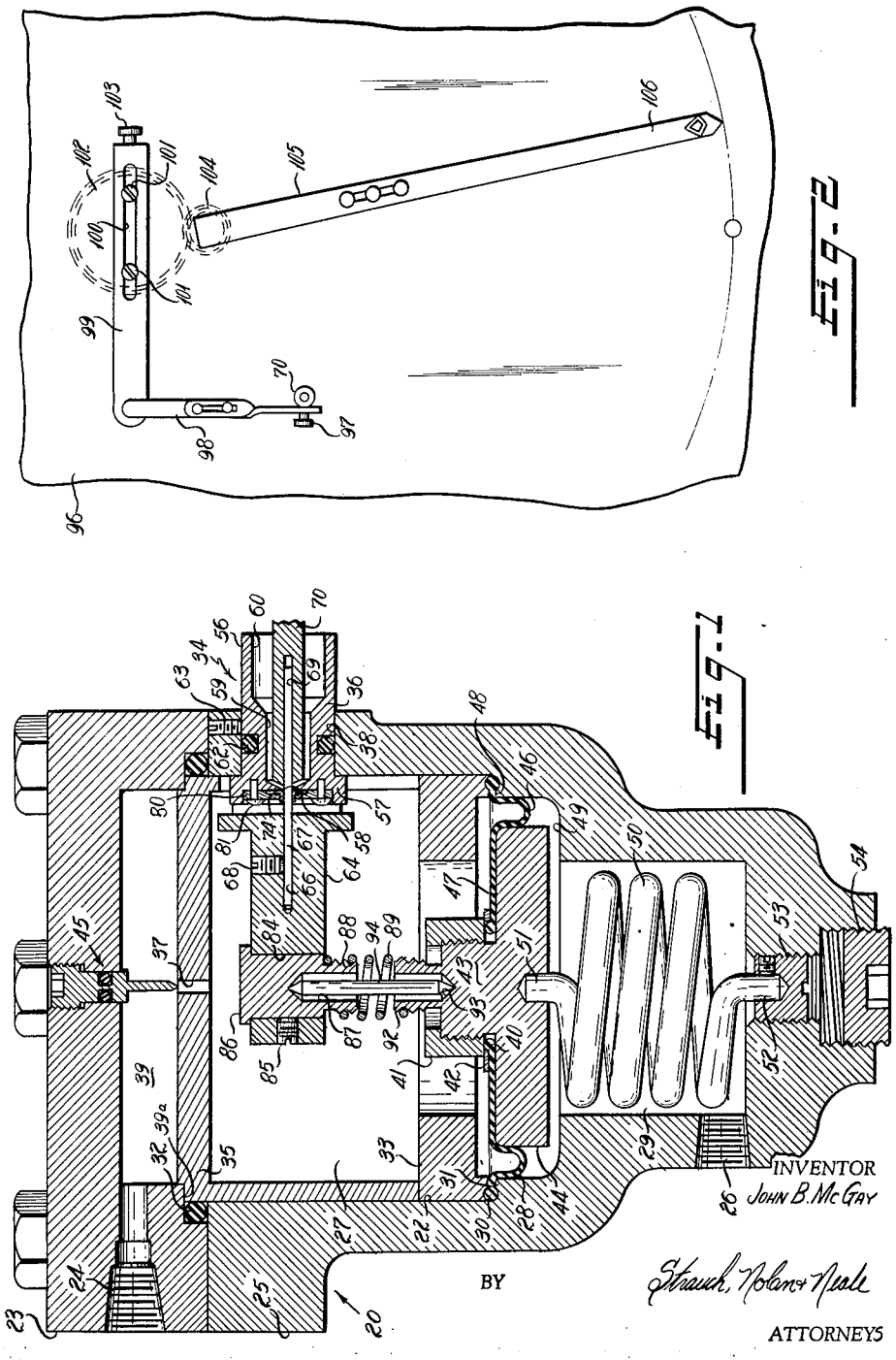

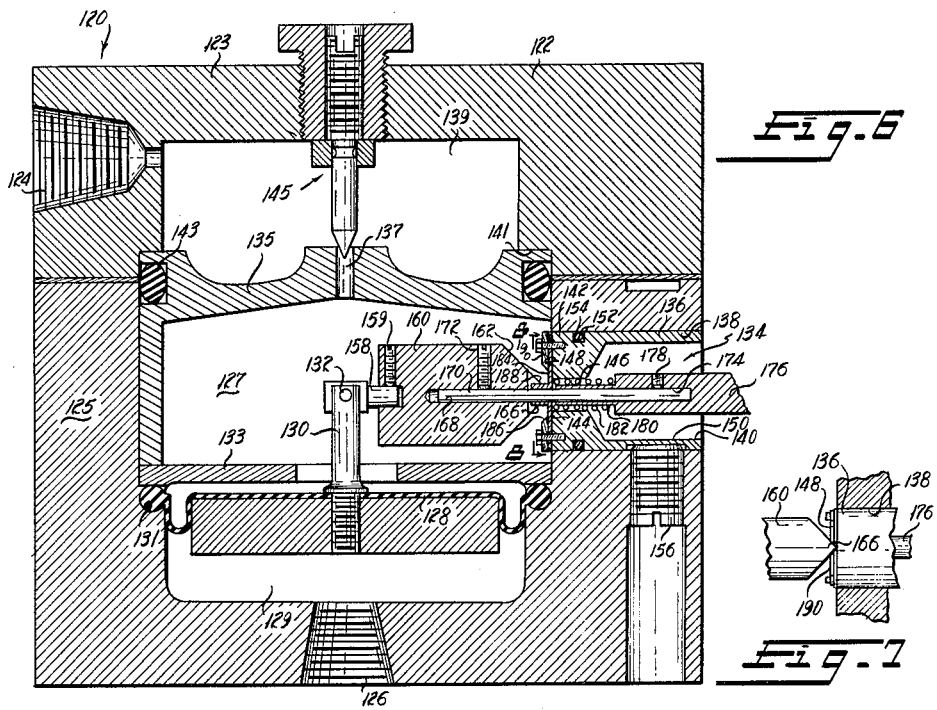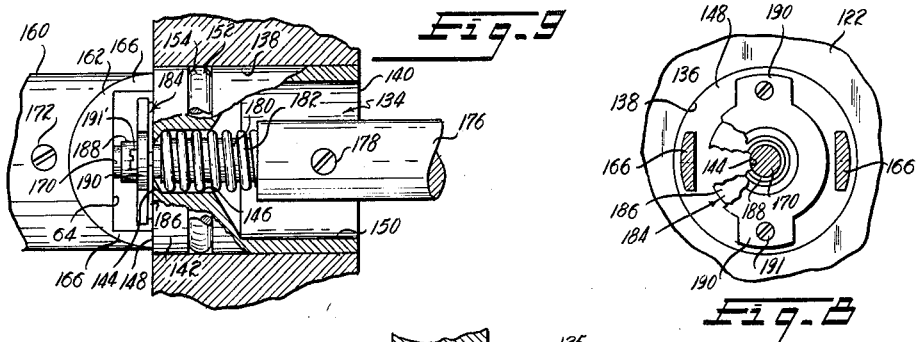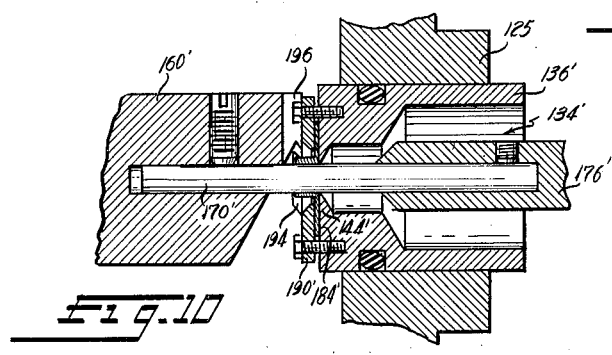

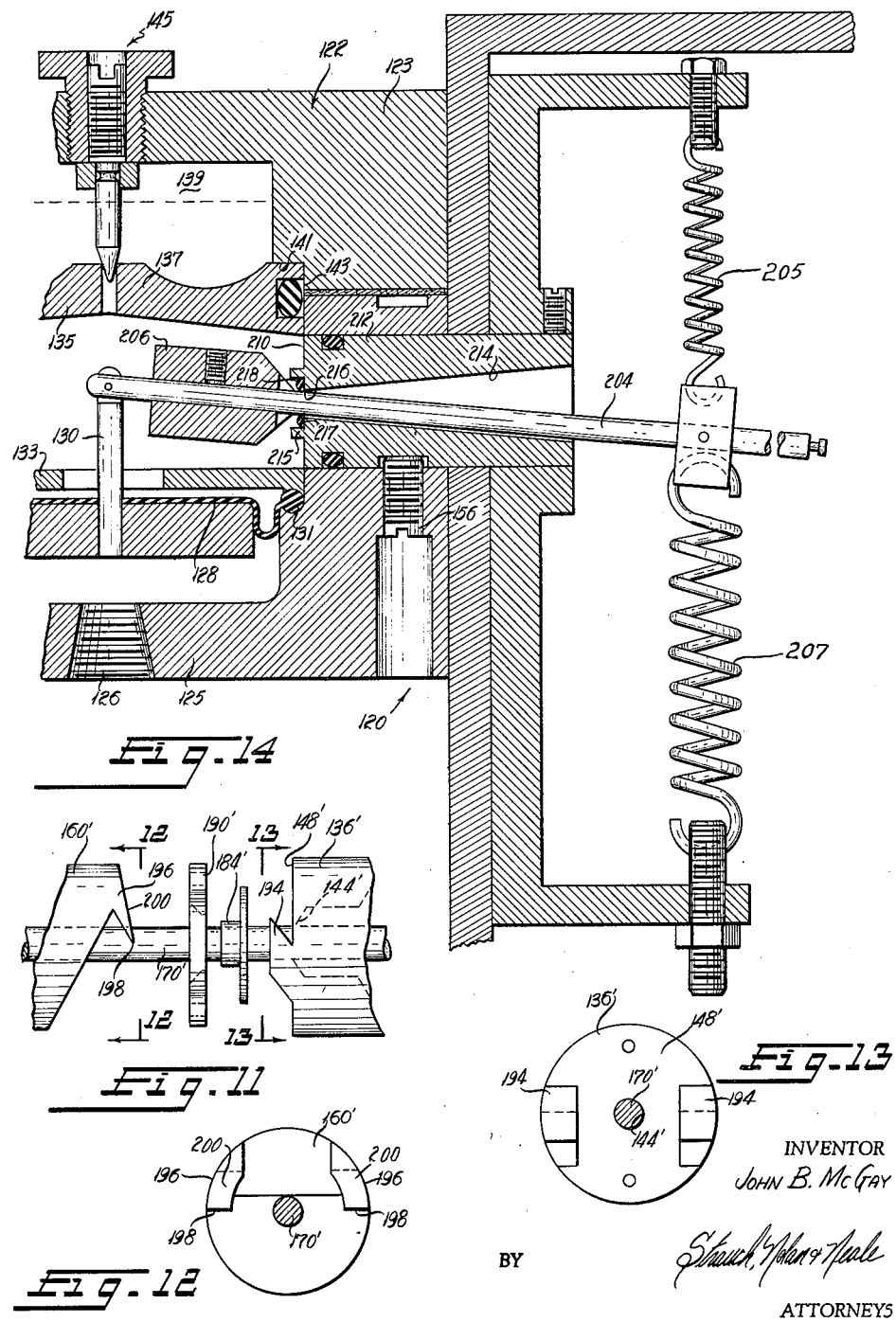

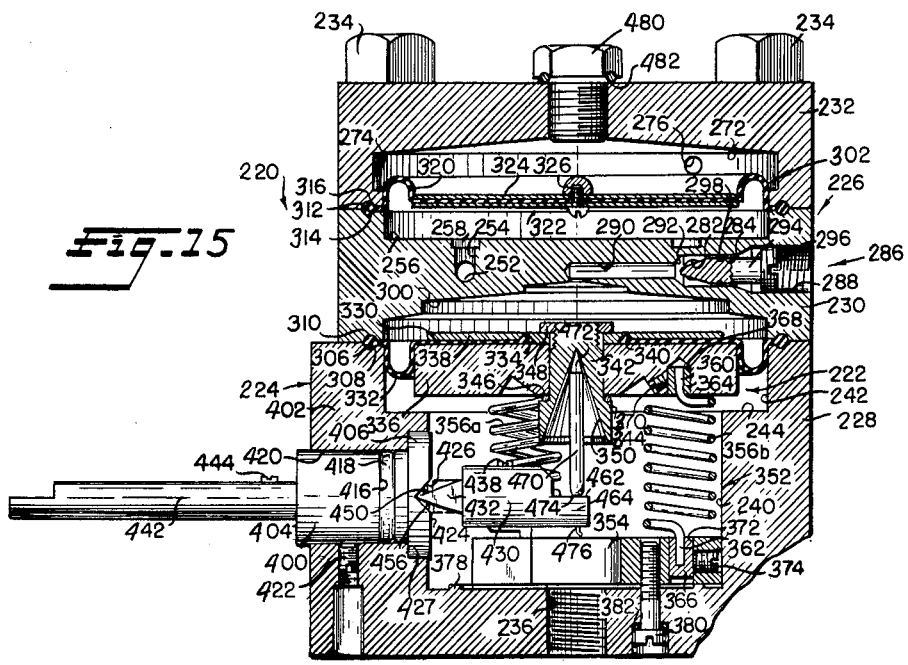

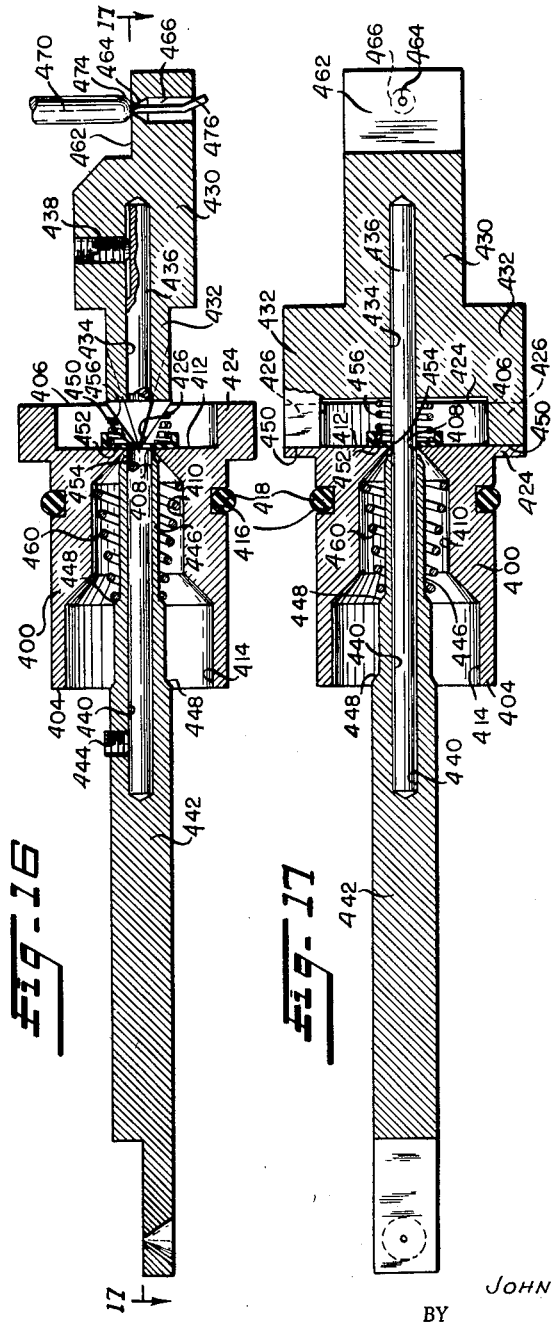

1

3,198,089
PRESSURE SENSITIVE DEVICE WITH SEALED
MOTION TRANSMITTING LEVER
John B. McGay, Tulsa, Okla., assignor to Rockwell Manufacturing Company, Pittsburgh, Pa., a corporation of Pennsylvania
Filed Sept. 29, 1961, Ser. No. 143,019
43 Claims. (Cl. 92—94)

This application is a continuation-in-part of co-pending application Serial No. 626,229, filed December 4, 1956, now abandoned, and also describes and claims subject matter originally described and claimed in co-pending application Serial No. 62,136, filed October 12, 1960, now Patent No. 3,136,130.

This invention relates to a pressure sensitive device with structure for transmitting motion through a wall and is more particularly concerned with diaphragm type differential meter having a sealed lever for transmitting pivotal rocking motion from the interior of a pressure vessel to the exterior.

The fluid pressure measuring devices presently in general use are of either bellows or mercury manometer type, and there are practical objections to each of these types. The metallic bellows commonly employed in bellows type instruments are subject to metallic fatigue causing eventual rupture, thus necessitating frequent replacement of the bellows. Mercury for manometric use is expensive in first cost and replacement, and its tendency to amalgamate with other metals and to react chemically with the fluids being measured often proves troublesome. Transmission of motion from the inside to the outside of a pressure vessel is desirable in many installations. This is particularly true in the case of liquid level indicators or controls, for example, the means indicating the differential pressure in an orifice meter. The motion transmitting member must be sealed against pressure leakage and the seal must be substantially free of pivotal drag. Present structures for mechanically transferring motion through the wall of a pressure chamber or vessel include the stuffing box, torque tube, ball and socket lever, magnetic means, diaphragms and bellows.

Although the prior art includes many pressure measuring instruments of the diaphragm type and they have structure for transmitting motion through a wall, insofar as is known, such instruments have not found wide acceptance, primarily because they have not provided requisite accuracy of measurement, ease of adjustment, a substantially friction free motion transmitting structure passing through a wall of the meter and long service life. Among the principal causes of measurement inaccuracy in the prior diaphragm type instruments were: change in effective area of the diaphragm with movement thereof in response to applied pressure differentials, leakage past the motion transmitting structure where it passes through the meter wall, lack of sensitivity to small increments of internal pressure change because of friction and inertia forces to be overcome, and the high production costs of prior art structures.

In the gas industry a specific need exists for accurate orifice meters. These meters are often installed at remote locations and must be dependable as to accuracy of measurement and must be as leak-proof as possible with negligible servicing required. The connection between the internal measuring device of such meters and the external indicator or recorder has always been a source of trouble. If the connection were made tight enough to be leak-proof, the accuracy of indication would be effected or if good acuracy were obtained by reducing the tight seal where the transmitting member passes through the pressure wall, leakage would result.

2

This structure consists of a new combination structure having an improved diaphragm and cooperative diaphragm chamber together with a new structure for transmitting motion from the inside of the diaphragm chamber to the outside. The diaphragm construction in so arranged that the net effective area of the diaphragm remains constant throughout its range of movement, and the diaphragm and diaphragm support structures are disposed so the diaphragm is substantially freely suspended for movement against its biasing spring, and the motion transmitting structure. The structure for transmitting motion from the inside of a pressure vessel to the outside permits a small arc of movement of a lever fulcrumed on or closely adjacent the inner surface of the vessel wall or of a removable member constituting a part of the wall. The lever is sealed against pressure leakage by a small flexible synthetic rubber or plastic seal. Lever movement is substantially frictionless at low values of pressure and by maintaining parts of the lever structure within a relatively close tolerance, particularly where the lever passes through the wall, friction will also be negligible at higher values of pressure.

Accordingly a primary object of this invention resides in providing a novel pressure sensitive device in combination with a motion transmitting lever structure for projecting, in fluid tight relationship, through a pressure wall and maintaining sensitivity of motion transmission.

Another object of the invention is the provision of novel confining chambers for the diaphragms of diaphragm type differential pressure indicators, which serve to limit the movement of and confine the diaphragm when excess pressure is applied to either side thereof, and also the provision of improved diaphragm capable of ballooning into and filling the diaphragm confining chambers when excess pressure is applied and which will return to original dimensions when excess pressure is released.

A further object of the invention resides in the provision of new and improved differential pressure measurement devices wherein accuracy and reliability of measurement are enhanced by diaphragm construction such that the net effective area of the diaphragm remains constant throughout its range of movement, and by diaphragm and diaphragm center support structure such that the diaphragm is substantially freely suspended for movement against its biasing spring.

A still further object of this invention resides in providing a motion transmitting lever structure for projecting, in fluid tight relationship, through a pressure wall and maintaining sensitivity of motion transmission.

Another object resides in providing a novel combination lever assembly consisting of a bushing, a lever passing through the bushing, a member on the lever providing a pivot relative to the bushing, a seal between the bushing and lever, and a portion of the bushing providing a support for the lever pivot member.

A still further object resides in providing a lever assembly including a bushing with an annular knife edge providing a small aperture through the bushing, a small circular rod through the aperture having a cross section dimension enabling a close free fit within said annular knife edge, an elastomeric ring disposed around the rod and sealingly fitting between said knife edge and said rod, and a pivotal member on the rod maintained against the bushing with the pivot axis transversely intersecting the rod axis, substantially coextensive with the annular knife edge.

Still another object resides in the provision of various shaped seal means and cooperating lever bushings to obtain a highly effective seal at a rocking lever pivot with substantially no deformation of the seal due to weight of the lever structure.

A still further object resides in providing a lever structure including a bushing having a knife-edged aperture, a pivotal support substantially in the plane of the knife edge of the aperture to receive spaced arms of a lever retainer to maintain the lever retainer in position relative to the bushing and to support the lever structure.

A further object resides in providing a lever structure including a bushing with a knife-edged aperture, an end wall abutment surface substantially coplanar with the knife edge of the aperture, and support lugs disposed on each side of the aperture shaped to receive spaced dependent knife-edged arms on a lever retainer to maintain the knife edges of the lever retainer arms against the bushing abutment and to support the lever structure.

A still further object resides in the provision, for use in a pressure measuring device, of a novel rocking motion transmitting lever assembly permitting essentially friction-free rocking movement at the location where motion transmission passes through the wall of the measuring device while retaining complete sealing against leakage.

Still another object resides in the provision of a rocking motion transmitting lever arrangement which includes an annular knife-edged orifice provided in an adaptor plug through a side wall, a V-shaped cross groove in the inner end of the adaptor plug, the bottom of the groove being coplanar with the orifice knife edge, and a motion transmitting rod passing essentially coaxially through the knife-edged orifice and having an additional straight knife-edged retainer which cooperates with the bottom of the V grooves in the adaptor plug to provide limited pivotal movement of the motion transmitting lever on an axis diametral to and in the same plane as the knife-edged orifice.

Further novel features and objects of this invention will become apparent from the following detailed description and the appended claims taken in conjunction with the accompanying drawings showing preferred embodiments thereof, in which:

FIGURE 1 is a vertical section view illustrating one embodiment of the present invention as used in a differential pressure measuring device for orifice meters;

FIGURE 2 is an end elevation view illustrating linkage for converting the rocking motion of the motion transmitting lever to rotary motion of an indicator member;

FIGURE 6 is a vertical section view illustrating an embodiment of the invention using a modified motion transmitting lever in an orifice meter;

FIGURE 7 is a reduced scale detail showing the lever fulcrum knife edge of FIGURE 6 in side elevation;

FIGURE 8 is a partially broken section view taken on line 8—8 of FIGURE 6 and illustrates the bushing, seal and washer around the lever;

FIGURE 9 is a partially broken detail view, looking at the top of the lever fulcrum shown in FIGURE 6;

FIGURE 10 is a vertical section view illustrating a further modification of lever fulcrum structure;

FIGURE 11 is an exploded side view of the fulcrum structure shown in FIGURE 10;

FIGURE 12 is an end view of the modified knife edge member, looking in the direction of line 12—12 in FIGURE 11;

FIGURE 13 is an end view of the knife edge receiving ears on the fulcrum bushing, looking in the direction of line 13—13 in FIGURE 11;

FIGURE 14 illustrates a further embodiment with fulcrum structure similar to that of FIGURE 6 but using a modified seal and a combined preloading and biasing means;

Figure 3:
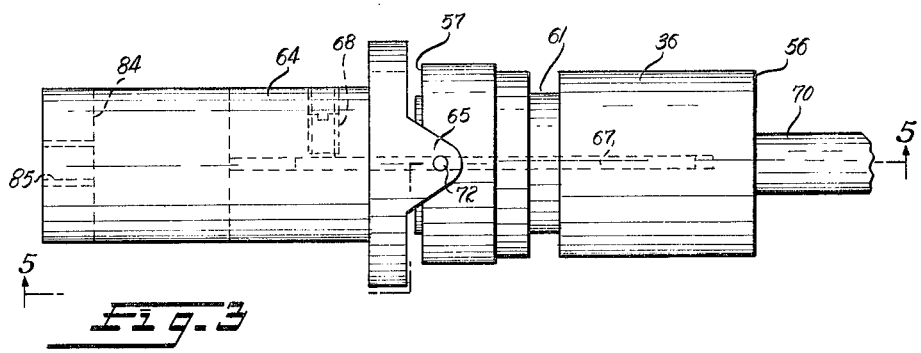
FIGURE 3 is an enlarged side elevation view of the motion lever and bushing disclosed in FIGURE 1, apart from the measuring device.

FIGURE 15 is a sectioned side view of a further type of differential pressure measuring device in which two upper modular sections provide a fluid dampened pressure responsive device in accord with the invention described and claimed in my aforenoted co-pending application Serial No. 62,136 and illustrating a fifth embodiment of a sealed motion transmitting assembly in accord with the present invention;

FIGURE 16 is an enlarged detail side view of the motion transmitting assembly of FIGURE 15 shown in section; and FIGURE 17 is a section view of the motion transmitting assembly taken on line 17—17 of FIGURE 16.

With continued reference to the drawings, wherein like reference numerals are used throughout to designate like elements, the pressure sensitive device selected for illustration is a differential pressure indicator adapted for use in flow rate measurement using an orifice or venturi tube and for use in other applications wherein it is desired to measure and/or record pressure differentials or actuate control mechanism in accordance therewith. By "pressure differentials" is meant the difference between any two fluid pressures, either of which may be above or below atmospheric pressure or itself be atmospheric pressure.

FIGURE 1 shows a pressure vessel 20 consisting basically of a two part housing with inner chamber 22, a high fluid pressure inlet 24 and a low fluid pressure inlet 26. Internal structure includes a diaphragm 28 that divides the chamber 22 into a high pressure portion 27 and a low pressure portion 29 whereby the diaphragm is responsive to the differential pressure between the two chambers. Through structure to be later described, diaphragm 28 is operatively connected to one end of a lever assembly 34. The lever assembly 34 projects through a fulcrum bushing 36 fixed in fluid tight relation within an aperture 38 through the side wall of pressure vessel 20. Linkage (FIGURE 2) for operating a control or an indicator in response to pressure differentials within the pressure vessel 20 is fastened to the external end of the lever assembly 34. Adjustable diaphragm preloading and loading springs are included in the pressure vessel.

The two part housing of vessel 20 has an upper closure 23, including the inlet 24, and a lower casing 25, including the inlet 26. Lower casing 25 is internally recessed with the lower portion of the recess being reduced in diameter to provide low pressure chamber 29 and a shoulder 31. The beaded outer edge 30 of diaphragm 28 is disposed on casing shoulder 31 and a centrally apertured plate 33 placed over the diaphragm 28 to retain the diaphragm edge 30 against shoulder 31. The peripheral edge of plate 33 and the shoulder 31 may be contoured with annular grooves as shown to securely grip the diaphragm edge. After plate 33 is in position the lever assembly 34 can be installed, with bushing 36 disposed in aperture 38 in the side wall of lower casing 25. An inverted inner oil choke bridge 35 with a cutout at one side (right-hand side of FIGURE 1) to clear the lever assembly 34 is placed in the lower housing recess on plate 33 and divides the upper chamber 27 above diaphragm 28. The upper wall of bridge 35 is provided with a central orifice 37. Closure member 23 is recessed to provide a high pressure inlet chamber 39 above the oil choke bridge 35 and is clamped by suitable means to the lower casing 25 so a recessed shoulder 39a of closure 23 engages the upper periphery of the choke bridge 35 to clamp the choke bridge, the plate 33, diaphragm 28 and the lower casing 25 in fixed relation. A suitable O-ring seal 32 is provided between the upper and lower casings. The beaded edge of diaphragm 28 being tightly clamped between plate 33 and casing shoulder 31 provides a fluid tight seal between the lower chamber 29 and upper chamber 27. Ring seal 32 between the closure 23 and lower casing 25 engages the periphery of choke bridge 35 and prevents high pressure fluid from passing around the sides of choke bridge 35, thus the only passage whereby fluid can enter the upper chamber 27 is through choke orifice 37. An adjustable needle valve assembly 45 is mounted in the closure member 23 and cooperates with the orifice 27 to adjustably control the effective orifice size in order to prevent undesirable momentary high pressure fluctuations from becoming effective.

With reference now to the diaphragm construction and function, as above indicated, the lower end of closure member 33 seals against a bead 30 formed integrally with the periphery of flexible diaphragm 28 which divides the hollow interior of pressure vessel 20 into a pair of isolated fluid pressure chambers 27 and 29. A similar bead 40 formed about a central aperture in the diaphragm 28 seals a threaded joint between a collar member 41, a washer 42 and a center threaded post 43 integral with a diaphragm piston 44, which can be termed a thrust member, which together constitute a diaphragm assembly. The dimensions of the casing and diaphragm support member grooves, in which the diaphragm beads are received preferably are such that the beads are compressed an amount sufficient to provide fluid sealing in a manner similar to that characteristic of conventional O-ring seals.

Diaphragm 28 may be plastic or rubber, natural or synthetic, and may be molded in shape. As shown, the diaphragm 28 has a relatively thin membrane portion 46 which is of U-section between its peripheral edges 47 and 48 on which are formed the beads 40 and 30, respectively. The U-shaped fold in diaphragm 28 permits full travel of the diaphragm and its center support assembly without substantially stretching the material of the diaphragm and without substantial change in the effective area thereof.

For substantially constant diaphragm effective area, the dimensions of the diaphragm and of the U fold therein, and the location of diaphragm clamping beads 30 and 40 vertically with respect to each other, should be such that the U-fold is of substantial depth and includes portions lying substantially flat against both the essentially cylindrical peripheral surface of piston 44 and the surrounding essentially cylindrical surface of lower casing 25, in all positions of the diaphragm and its center support throughout the full range of travel thereof. This assures that the low points of the freely depending U portion of the diaphragm remain a substantially constant distance from the diaphragm center line and, accordingly, that the circumferential line made up of such low points remains of substantially constant diameter. Since the fluid pressure differential effectively acts on a diaphragm area which is proportional to the diameter of this circumferential line, by maintaining the diameter thereof constant it thus is possible to assure that the effective area of the diaphragm remains substantially constant at all diaphragm positions throughout its full range of movement. Thereby the complex mechanism, as frequently resorted to in prior art devices for compensating for changes in diaphragm effective area, is obviated.

While diaphragm 28 should be substantially inelastic at least to fluid pressures within the normal operating ranges of the instrument, the diaphragm may, if desired, be made of material having sufficient elasticity that, if the diaphragm is subjected to pressure differentials substantially greater than those which the instrument was designed to measure, the diaphragm after moving to the limit of its travel will then balloon into and seal against the walls of the lower pressure chamber 29 without rupturing.

The diaphragm position in FIGURE 1 is at mid-stroke or one half of its total range of movement. When the pressure measuring device is used with an orifice plate in a fluid line, the upstream pressure from the orifice plate (not shown) is applied at opening 24 and downstream pressure at opening 26. The sections of upper chamber portion 27 on both sides of the bridge choke member 35 are filled with oil or other fluid, the flow of which through orifice 37 is metered by needle assembly 45. As the differential of the pressure in chamber 27 over the pressure in chamber 29 increases, diaphragm 28 and its center support piston 44 will move downwardly until the piston 44 seats on the internal shoulder 49 in lower casing 25, then if the pressure differential continues to increase, the diaphragm fold 46 will balloon down into and press against the wall surfaces in the annular space between the vertically disposed peripheral walls of piston 44 and lower casing 25. Since the extent of this ballooning action is limited by the small size of the space between piston 44 and lower casing 25, there is little possibility of diaphragm rupture and the diaphragm is not stretched beyond a point where it will not return to original size and shape on release of pressure. Similarly, should the pressure in chamber 29 become excessive in relation to that in chamber 27, the diaphragm 28 will then move up and close off against plate member 33.

The diaphragm assembly is supported in the vessel by a calibrated compression spring 50 having is upper end 51 rigidly secured to the bottom of piston 44 and its lower end 52 rigidly secured by a set screw in an adjusting screw 53. Screw 53 is threaded in a central opening in the bottom of lower casing 25 and a threaded plug 54 closes the bottom opening. Prior to assembly of the plate member 33, choke bridge 35 and closure 23 to clamp the outer bead 30 of diaphragm 28, the zero position of the diaphragm assembly can be adjusted by using an appropriate tool engaged to turn the screw 53. When the zero position is set the diaphragm assembly is connected to the lever assembly 34 and the plate 33, choke bridge 35 and closure 23 then clamped in assembly.

Figure 4:
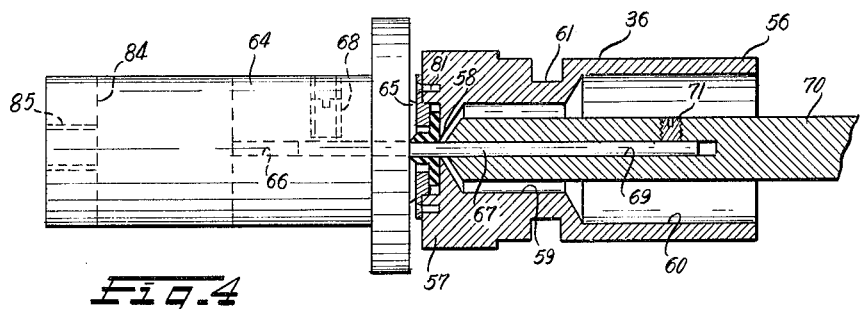
FIGURE 4 is a view similar to FIGURE 3 with the bushing and seal sectioned to illustrate details.
Figure 5:
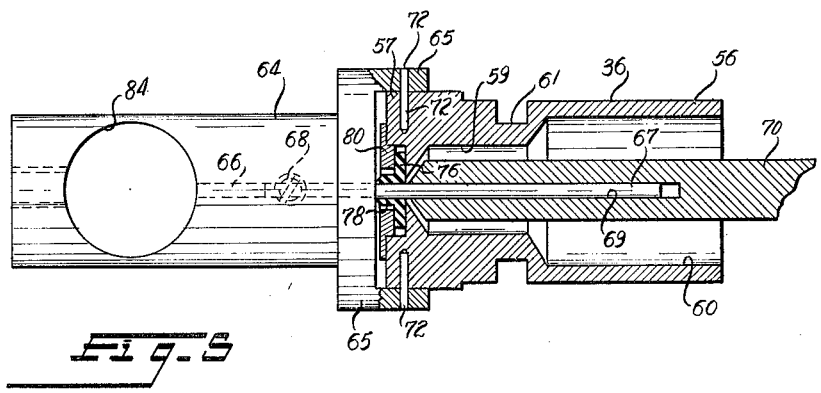
FIGURE 5 is a partially sectioned view taken on line 5—5 of FIGURE 3 illustrating the pivotal arrangement between the motion lever and the bushing.

Referring to FIGURES 1 and 3 through 5, bushing 36 is a hardened metal cylinder with a skirted outer end 56. The opposite end 57 of bushing 36 has a transverse end wall with a central annular knife edged aperture 58 resulting from a tapered bottom counterbore 59 from the open end 56 intersecting the flat outer surface of the bushing end 57. A second larger counterbore 60 from the open end of bushing 36 provides clearance for lever tilt movement. An annular groove 61 in the external cylindrical surface of bushing 36 retains an O-ring seal 62 that engages and seals against the wall of aperture 38. Bushing 36 can be fastened in the wall of lower section 25 by any suitable means as the set screw 63 (FIGURE 1).

Lever assembly 34 includes a lever retainer 64, the right-hand end having two diametrically spaced arms 65 and an axial bore 66 in which a small diameter hardened metal rod 67 is secured by a set screw 68. Rod 67 projects through the knife edged aperture 58 in bushing 36 with a close but free fit and is received and fastened in an axial bore 69 in a lever extension bar 70 as by a set screw 71. The end of extension bar 70 terminates closely adjacent the annular knife edge of aperture 58 leaving a very short extent of the small diameter rod 67 between the lever retainer 64 and bar 70 to eliminate the possibility of rod flexing. The arms 65 of lever retainer 64 are pivotally fastened to bushing 36 by hardened metal pins 72 diametrically disposed relative to the bushing axis, on a pivot line disposed in the plane of the annular knife edge of aperture 58 and normal to the direction of movement of the diaphragm assembly. Extension bar 70 constitutes the end of lever assembly 34, and as aforementioned, is connected through the linkage shown in FIGURE 2 to transfer the lever tilting movement to an indicator or control.

A flexible synthetic rubber or other resilient plastic seal 74 with a flat disc-shaped body 76 and a central collar 78 tightly fitted around the rod 67 is sealed against the surface of bushing end 57 all around by a clamp washer 80 that at its top and bottom is fastened to the bushing 36 by screws 81. The lever retainer arms 65 form a bridge over the sides of seal 74 and washer 80 to their pivotal connection with the bushing.

As the end of lever retainer 64 is moved up or down in response to changes in meter conditions the lever assembly 34 rocks on the pivot axis of retainer arms 65 and there is a minute sliding of the small rod 67 relative to the edge of aperture 58. The weight of lever assembly 34 is preferably kept to a low value. The lightweight lever assembly supported on the bushing 36 by the small lever retainer pivot pins 72 and the small annular seal contact between rod 67 and the knife-edged aperture 58 result in negligible friction between the lever assembly 34 and bushing 36. Pressure from within the chamber 22 forces seal 74 toward the minute clearance between rod 67 and aperture 58, resulting in a fluid tight pressure seal.

Except for a very small area change, where the small diameter rod 67 passes through the bushing aperture 58, the area of lever assembly 34 subject to the pressure inside pressure chamber 22 is constant and the balance of forces developed in the lever assembly by the internal pressure remains essentially unchanged throughout the pivotal movement of the lever, hence there is no tendency for such pressure to move the lever up or down by changes of lever position or by changes in internal pressure as would occur where ball and socket, diaphragm or stuffing box fulcrums are utilized.

As previously mentioned, the bushing 36, lever retainer pins 72 and small diameter rod 67 are of hardened metal to prevent wear of the pivot pins and the surfaces engaged by the pins. If desired, hardening of the bushing can be localized to the immediate knife-edged portion and the area engaged by the pivot pins.

The end of lever retainer 64 opposite the arms 65 has a transverse hole 84 which in the assembled structure is disposed essentially vertically above the center of the diaphragm assembly. Fixed rigid in the hole 84 by a set screw 85 is a plug 86 with a conical bottom blind bore 87 opening downwardly. The lower end 88 of plug 86 extends below the lever retainer 64 and is threaded to receive an end of a tension spring 89. A reduced diameter end 92 of threaded post 43 on piston 44 is threaded and provided with a conical bottom blind broe 93. Disposed between the plug 86 and piston 44 is a connecting link 94 with needle ends disposed in blind bores 87 and 93. Prior to tightening set screw 85 to rigidly fix plug 86 to lever retainer 64, the plug 86 and tension spring 89 are turned down to securely engage the lower end of spring 89 on the threaded end 92 of piston 44 placing the spring 89 under tension to maintain the lever retainer 64, link 94 and piston 44 is a biased assembly. This affords a flexible connection between the diaphragm assembly and lever assembly 34 having a minimum of frictional loss during transfer of reciprocatory diaphragm motion to rocking lever assembly motion.

In FIGURE 2, a suitable indicator linkage is illustrated with the indicator casing 96 shown by a broken line. The projecting end of extension bar 70 is connected by a thumb screw 97 to one end of an adjustable length link 98 which in turn is pivotally connected at its other end to a lever 99. Lever 99 has an elongate slot 100 through which two screws 101 pass to clamp the lever 99 to the face of a large spur gear 102 disposed for rotation on a fixed axis. An adjusting screw 103 in the end of lever 99 abuts the periphery of gear 102 and enables minute adjustments in the length of lever 99, when screws 101 are loosened, to calibrate the instrument. A small pinion 104 disposed for rotation on an axis parallel to that of gear 102 is meshed with gear 102. Pen arm 105 is fixed to rotate with small pinion 104 and a removable pen 106 is clipped to the end of the pen arm. Reciprocable up and down movement of extension bar 70 due to pressure changes in the pressure vessel 20 actuates link 98 and lever 99 to rotate spur gear 102. Gear 102 rotates pinion gear 104 causing pen 106 to swing its arc on a record chart (not shown).

With reference now to the pressure vessel embodiment of FIGURE 6, a measuring device 120 consisting basically of a chamber 122 with a two part housing has a high fluid pressure inlet 124 and a low fluid pressure inlet 126. Internal structure includes a diaphragm 128 that divides the chamber 122 into a high pressure section 127 and a low pressure section 129 whereby the diaphragm is responsive to the differential pressure between the two chambers. A post 130 is fixed to diaphragm 128 and has an apertured end 132 which is pivotally connected to one end of a lever assembly 134. The lever assembly 134 projects through a fulcrum bushing 136 fixed in fluid tight relation within an aperture 138 through the side wall of pressure chamber 122. Linkage, which can be similar to that in FIGURE 2, for operating a control or an indicator in response to pressure differentials within the measuring device 120 is fastened to the external end of the lever assembly 134. Adjustable diaphragm preloading and loading springs (not shown) are normally included in the measuring device.

The two part housing of measuring device 120 has an upper casing 123, including inlet 124, and a lower casing 125, including inlet 126. Lower casing 125 is internally recessed with the lower portion of the recess being reduced in diameter to provide low pressure chamber 129 and a shoulder 131. The beaded edge of diaphragm 128 is disposed on casing shoulder 131 and a centrally apertured plate 133 placed over the diaphragm 128 and post 130 to retain the diaphragm edge against shoulder 131. The peripheral edge of plate 133 and the shoulder 131 may be contoured as shown to securely grip the diaphragm edge. After plate 133 is in position the lever assembly 134 can be installed with bushing 136 disposed in aperture 138 in the side wall of lower casing 125. An inverted inner fluid choke housing 135 with a cutout at one side to clear the lever assembly 134 is placed in the lower housing recess on plate 133 and forms the upper chamber 127 above diaphragm 128 with a central orifice 137. Upper casing 123 with recessed high pressure inlet chamber 139 is clamped by suitable means to the lower casing 125 with a recessed shoulder 141 engaging the upper periphery of inner housing 135 to clamp the inner housing, the plate 133, diaphragm 128 and the lower casing 125 in fixed relation. A suitable gasket is provided between the upper and lower casings. The beaded edge of diaphragm 128, being tightly clamped between plate 133 and shoulder 131, provides a fluid tight seal between the lower chamber 129 and upper chamber 127. A ring seal 143 carried in an annular groove in the inner housing 135 prevents high pressure fluid from passing around the sides of inner housing 135, thus the only passage for fluid to enter the upper chamber 127 is through orifice 137. An adjustable needle valve assembly 145 is mounted in the upper casing 123 and cooperates with the orifice 137 to adjustably control the effective orifice size in order to prevent undesirable momentary pressure fluctuations from becoming effective.

Referring to FIGURES 6, 8 and 9, bushing 136 is a hardened metal cylinder with a skirted outer end 140. The opposite end 142 of the bushing 136 has a transverse end wall with a central annular knife-edged aperture 144 resulting from a tapered bottom counterbore 146, from the open end 140, intersecting the flat outer surface 148 of the bushing end wall. A second larger counterbore 150 from the open end of bushing 136 provides clearance for lever tilt movement. An annular groove 152 in the external cylindrical surface of bushing 136 retains an O-ring seal 154 that engages and seals against the wall of aperture 138. Bushing 136 can be fastened in the wall of chamber 122 by any suitable means as the set screw 156.

Lever assembly 134 includes a short rod 158, pivotally attached to the diaphragm post 130 and fastened as by set screw 159 in a blind bore of a lever retainer 160. The other end 162 of retainer 160 is provided with an abrupt taper and has a transverse diametral channel 164 forming two diametrally spaced knife-edged arms 166. Retainer end 162 has a coaxial blind bore 168 in which a small diameter hardened metal rod 170 is secured by a set screw 172. Rod 170 projects through the knife-edged aperture 144 in bushing 136 with a close but free fit and is received and fastened in an axial bore 174 in a lever extension bar 176 as by a set screw 178. A reduced end portion 180 of extension bar 176 terminates closely adjacent the annular knife edge of aperture 144 and together with a coil compression spring 182 limits possible lever movement to the left or toward the inside of the orifice meter. The coil spring 182 also resiliently urges the knife-edged arms 166 of retainer 160 into pivotal abutment against the flat smooth bushing end surface 148 on a pivot line that is diametrally disposed across the bushing aperture 144 and disposed normal to the direction of movement of the diaphragm post 130. Extension bar 176 constitutes the end of lever assembly 134, and as aforementioned, is connected through appropriate linkage to transfer the lever tilting movement to an indicator or control.

A flexible synthetic rubber or other resilient plastic seal 184 with a flat disc-shaped body 186 and a central collar 188 tightly fitted around the rod 170 is sealed against the bushing end surface 148 all around by a clamp washer 190 that has top and bottom fastening lugs fastened to the bushing 136 by screws 191. The lever retainer knife-edged arms 166 form a bridge over the sides of seal 184 and washer 190 to engage the bushing end surface 148.

As the end of lever retainer 160 is moved up or down in response to changes in meter conditions the lever assembly 134 rocks on the pivot axis where the knife edges of retainer arms 166 abut the bushing surface 158 and there is a minute sliding of the small rod 170 relative to the thin edge of aperture 144. The weight of lever assembly 134 is preferably kept to a low value. The lightweight lever assembly supported on the bushing 136 by the knife-edged retainer 160 and the line contact between rod 170 and the knife-edged aperture 144, which results in negligible friction between the lever asembly 134 and bushing 136. Pressure from within the chamber 122 forces seal 184 toward the minute clearance between rod 170 and aperture 144, resulting in a fluid tight pressure seal, and similarly to the lever assembly in FIGURE 1, excepting for a very small area change, where the small diameter rod 170 passes through the bushing aperture 144, the area of lever assembly 134 subject to the pressure inside pressure chamber 122 is constant and the balance of forces developed in the lever assembly by the internal pressure remains essentially unchanged throughout the pivotal movement of the lever.

As previously mentioned, the bushing 136, lever retainer 160 and small diameter rod 170 are of hardened metal to prevent wear of the knife edges and the surfaces engaged by the knife edges. If desired, hardening can be localized to the immediate knife-edged portions and the areas abutted by the knife edges.

FIGURES 10–13 illustrate a further modification of a fulcrum arrangement which will eliminate the small friction present in the embodiment of FIGURE 6, where the small diameter rod passes through the bushing aperture. The bushing 136' is substantially identical with bushing 136 except that the former includes two integral knife edge receiving ears 194 disposed one on each side of the washer 190' and seal 184'. Lever retainer 160' of the lever assembly 134' is formed with two laterally spaced dependent arms 196 terminating in knife edges 198 that hook over the bushing ears 194 and bear against the base of the ears in a bearing pivot axis that is horizontally disposed normal to the axis of the knife-edged annular bushing aperture 144' and is essentialy disposed in the plane of the bushing end face 148'. The end faces 200 of retainer arms 196 are inclined away from the knife edge 198 to provide clearance between the arms 196 and bushing end face 148' when the lever assembly 134' rocks on the knife edges 198. In this modification the rod 170' does not rest on the knife edge of bushing hole 144' because the entire lever assembly is supported by arms 196. Furthermore, the reduced end portion can be omitted from lever extension bar 176' and there is no need for the coil spring 182 of the previously described embodiment because the hooked cooperation between retainer arms 196 and the bushing ears 194 will prevent inadvertent movement of the lever assembly 134' into the pressure chamber.

An additional modification of the seal structure and lever assembly is illustrated in FIGURE 14. The lever rod 204 is a larger diameter than intermediate rod in the other embodiments and can be connected directly between the diaphragm post 130' and the operated mechanism (not shown). A horizontal knife edge lever retainer 206 is adjustably fixed, as by a set screw, to the inner end of rod 204 and pivotally abuts the flat smooth end face 210 of bushing 212 in a manner similar to that of the second embodiment. Bushing 212 has a tapered passage 214 terminating in the annular knife-edged opening 216 providing clearance to permit rocking movement of lever 204 about the pivotal abutment knife-edged retainer 206.

The end face 210 of bushing 212 has an annular rim 215 surrounding the opening 216 and providing a retaining recess 217 for a half of an O-ring seal 218. Prior to assembly of seal ring 218 in recess 217, the outer diameter of seal 218 is slightly larger than that of recess 217 and after assembly the inner diameter is slightly smaller than that of the lever rod 204. When rod 204 is projected through seal 218 and pressure in the pressure chamber acts against seal 218 a pressure tight seal is maintained between the seal 218, the recess 217 and rod 204 essentially characteristic of an O-ring seal yet the major weight of rod 204 is on the knife edge of bushing opening 216 and not on the seal 218.

This is not the preferred embodiment, particularly for installations where low pressures are prevalent, because the large diameter lever rod will result in a higher friction force at the knife-edged aperture that may affect the transmission sensitivity. However, the strength of the lever rod will enable use of external preload and load springs 205 and 207 respectively, fastened to the lever rod 204 for loading the pressure condition responsive device. These springs 205 and 207 also provide a biasing force maintaining the lever retainer 206 in engagement with the end surface 210 of bushing 212.

FIGURES 15, 16 and 17 illustrate an embodiment of a motion transmitting lever as used in a differential pressure measuring device 220, specific details of which are described and claimed in the aforenoted co-pending application Serial No. 62,136. In that device 220, a horizontally disposed diaphragm assembly 22 is shiftable up and down in response to changes in differential pressures, such as obtained by means of an orifice (not shown) disposed in a fluid flow line. A motion transmitting lever assembly 224 is connected to the diaphragm assembly 222 and projects through a chamber wall to the exterior of the diaphragm chamber. Measuring device 220 has a pressure housing 226 constructed in stacked sectional form consisting of three sections, a base section 228, an intermediate or center section 230 and an upper or cap section 232. The three sections 228, 230 and 232 are clamped together as a rigid assembly by four large screws 234 which pass freely through holes in the two uppermost sections and are threaded in threaded bores in bottom section 228.

Pressure connections to housing 226 are enabled by tapped passages from the lower side of bottom section 228. One of the passages 236 is centered in the bottom wall of base section 228 and is the low pressure inlet into a cylindrical chamber 240 having an uppermost portion 242 of increased diameter which forms an annular abutment platform 244.

By means of passages and nipple connectors, not a specific part of the present invention and therefore not illustrated, an inlet passage for fluid is provided from a bottom high pressure inlet opening to and through various passages into chamber 256 in the upper surface of center housing section 230.

The lower surface of the cap section 232 is recessed to provide a chamber 272 having a peripherally undercut recess 274 into which opens a drilled passage 276. Passage 276 intersects a vertical passage (not shown) leading to the lower surface of the cap section 232 and coextensive with other short passages provides a fluid communication intersection with a cross passage 282 leading to the cylindrical chamber 284 of a needle valve 286. A threaded coaxial counterbore 288 extends from one exterior side of the center section 230 to one end of the needle valve chamber 284, the other end of the needle valve chamber 284 opening in to a reduced diameter coaxial passage 290 extending to the approximate center of section 230. The shoulder 292 formed by the intersection between needle valve chamber 284 and passage 290 serves as the seat (which can be tapered) for a valve needle 294 which has an enlarged threaded and slotted head 296 threaded in to the counterbore 288. A circumferential groove in the needle 294 carries a small O-ring 298 which provides a fluid seal between the needle body and the wall of needle valve chamber 284 to prevent leakage past the needle shank. The aforedescribed passage 290 opens to the center of a stepped recess or chamber 300 in the lower surface of center section 230.

The three housing sections 228, 230 and 232 thus are shaped to form four chambers 240, 300, 256 and 272 from bottom to top. Chamber 240 in base section 228 is isolated from chamber 300 in the lower surface of center section 230 by the previously referred to diaphragm assembly 222 and chamber 256 in the upper surface of center section 230 is isolated from chamber 272 in the cap section 232 by a second diaphragm assembly 302. The two diaphragm assemblies 222 and 302 can be readily removed when the housing sections are disassembled, the outer peripheral seal between the sections and each diaphragm assembly being accomplished by clamping an outer peripheral bead on the flexible material of each diaphragm assembly in matched annular grooves in the joinder surfaces of the associated sections. This is clearly shown in FIGURE 1 where peripheral bead 306 on diaphragm assembly 222 is clamped and form a sealed joint between groove 308 in base section 228 and groove 310 in center section 230, and peripheral bead 312 on diaphragm assembly 302 is clamped and forms a sealed joint between groove 314 in the upper surface of center section 230 and groove 316 in the lower surface of cap section 232.

The upper diaphragm assembly 302 is used to isolate dampening fluid from line fluid and at the same time to transmit pressure force from one fluid to the other. Hence it is a relatively simple assembly consisting of a flexible rubber or rubber-like diaphragm 320 with the peripheral bead 312 and an outer annular portion of U-shaped cross section which will permit shifting movement of the diaphragm assembly without stressing the diaphragm material. To thin discs 322 and 324, one on each side of diaphragm 120, are clamped together by the nut and bolt 326 and serve as stiffeners for the assembly 302.

Diaphragm assembly 222, the assembly by which changes in line fluid pressure are converted to a mechanical indication, is a more complex structure than assembly 302 and in addition includes a pre-set biasing spring sub-assembly. This main diaphragm assembly 222 includes a flexible rubber or rubber-like diaphragm 330 with the aforedescribed outer peripheral bead 306 and an outer annular portion 332 of U-shaped cross section to enable normal shifting movements of assembly 222 without stressing the diaphragm due to stretching. The inner portion of diaphragm 330 terminates in an annular peripheral bead 334 which is securely clamped between a heavy disc-like diaphragm carrier 336 on the underside and a thin disc 338 on the upper side. The upper disc 338 includes an annular groove 340 which receives the inner peripheral bead 334 of diaphragm 330, preventing any tendency for the diaphragm 330 to be pulled from between carrier 336 and disc 338.

Diaphragm carrier 336 and upper disc 338 are concentrically apertured for receiving a clamping bolt 342, the head 344 of which is shouldered and located below the diaphragm carrier 336. An O-ring 346 carried on the bolt shank is clamped between the bolt head 344 and carrier 336 when the bolt 342 and its nut 348 are tightened and prevents leakage along the bolt 342 through the center of the diaphragm. The head 344 of bolt 342 is formed with a tapered socket 350 which receives one end of a push link to be hereinafter described.

As has been briefly described, the diaphragm assembly 222 carries its own pre-set biasing spring assembly 352 which consists of a base plate 354 and three spaced compression springs, two of which 356a and 356b can be seen connected between the base plate 354 and diaphragm carrier 336. Each compression spring 356 is a straight coil spring having both ends 360 and 362 bent to extend substantially concentric and away from the spring coils. Small ferrules 364 and 366 are fastened to respective spring ends 360 and 362 by brazing. Upper spring end ferrules 364 fit into blind sockets 368 in the lower surface of diaphragm carrier 336 wherein they are secured by set screws 370. The lower spring end ferrules 366 are fitted into vertical holes 372 through the spring base 354 and secured by set screws 374.

Spring base 354 is U-shaped, somewhat in the manner of a horseshoe, to enable its removal as part of the diaphragm assembly 222 without disturbing the motion transmitting lever assembly 224. The lower surface of the U-shaped base 354 is planar and rests on a smooth planar upper surface of an annular ridge 378 formed on the base surface of lower chamber 240. Ridge 378 eliminates the need of making the entire bottom surface into a planar mounting pad. The outer periphery of spring base 354 constitutes the major part of a cylindrical surface and has a close free fit within the cylindrical chamber 240. A single screw 380 carrying a sealing O-ring 382 under its head secures the spring base plate 354 to the lower wall of the housing base section 228, the screw head being recessed into the outer surface of the wall and accessible from the underside of the chamber base section. When housing sections 228 and 230 are disassembled, the outer periphery of diaphragm 330 is released and removal of screw 380 will permit the complete diaphragm assembly 222, its carrier plate 336, biasing springs 356 and spring base plate 354 to be lifted out of bottom section 228 without disturbing the motion lever, thus facilitating changes in the pressure measuring range of the indicator by substituting a complete diaphragm assembly 222 with pre-set biasing spring values as desired.

*Additional lever assembly embodiment*

Referring to FIGURES 15, 16 and 17, the motion transmitting lever assembly 224 includes a bushing 400 fixed in the side wall 402 of the chamber base section 228. Bushing 400 is a hardened metal cylinder with a skirted exterior end 404 and a transverse end wall at its interior end 406. The transverse end wall has a central, annular, knife-edged aperture 408 resulting from the tapered bottom of a counterbore 410 from the open skirted end 404 intersecting the plane surface 412 of the interior end 406. A second larger counter 414 in the exterior end of bushing 400 provides clearance for lever tilt movement. An annular groove 416 in the external cylindrical surface of bushing 400 retains an O-ring seal 418 which provides a fluid seal between bushing 400 and the cylindrical wall of the side wall aperture 420.

Bushing 400 is fastened in base section 228 by a set screw 422 (FIGURE 15) after being inserted through the wall aperture 420 from the inner side of wall 402. The inner end flange 424 of bushing 400 extends in both a radial and an axial disposition and abuts a recessed shoulder 427 at the interior end of side wall aperture 420 to locate the bushing. Flange 424 also prevents interior pressures from blowing the bushing out of the aperture. Shown in FIGURES 15 and 16, V-cuts 426 are machined in diametrically opposite side portions of the axially projected part of flange 424, the bottom of the V-cuts being in the plane of aforedescribed bushing surface 412 and being aligned on a diametrical line of the knife-edge aperture 408.

Lever assembly 224 includes a lever actuator 430 with two diametrically spaced arms 432 at its left-hand end and an axial bore 434 in which a small diameter hardened metal rod 436 is secured by a set screw 438. The rod 436 projects through the knife-edged aperture 408 in bushing 400 with a close but free fit and is received and fastened in an axial bore 440 in a lever extension bar 442 by a set screw 444. One end 446 of the extension bar 442 is of reduced diameter and terminates closely adjacent the annular knife edge of aperture 408 leaving a very short extent of the small diameter rod 436 between the lever actuator 430 and bar 442 to substantially eliminate possibility of the rod flexing. The arms 432 of lever actuator 430 terminate in horizontally coaligned knife edges 450 which have less of an angle than the V-cuts 426 and rests in the V-cuts 426 so that the straight knife edges 450 are diametrally disposed relative to the bushing axis, on a pivot line disposed in the plane of the annular knife edge of aperture 408 and normal to the direction of movement of diaphragm assembly 222. Extension bar 442 constitutes the exterior end of lever assembly 224 and is connected through linkage to transfer the lever tilting movement to an indicator or control device. An example of such a linkage is shown in FIGURE 2.

The straight knife-edged arms 432 form a bridge disposed over a flexible synthetic rubber or other resilient plastic seal 452 having a thin flat disc-shaped body and a central aperture 454 which is snugly fitted around the rod 436 and held against the plane surface 412 of bushing end 406 by a light coil compression spring 456 encircling rod 436 and abutting actuator 430. The seal disc may be cupped so its peripheral rim serves as a spring guide, as in FIGURES 15 and 16. The thin flat seal disc 452, when subjected to pressure from the interior of chamber 240, functions in a manner similar to an O-ring in sealing the very small clearance between rod 436 and the knife-edged aperture 408, the light spring 456 merely serving to provide a slight bias to hold the seal washer in place against the wall surface 412 when no fluid pressure is acting on the seal.

A tapered coil spring 460 with its small end fitted over the reduced end portion 446 of extension bar 442 and seated on the extension bar shoulder 448 and with its large end seated at the largest diameter of bushing counterbore 410 serves to urge the knife edges 450 of the lever actuator 430 into close engagement with the base of V-cuts 426. With the knife edges 450 so held, actuator 430 may be rocked up or down through a limited travel of about 10 degrees and theoretically the rod 436 will be exactly centered in the annular knife-edged aperture 408 and will not touch the annular knife edge. The weight of lever assembly 224 is preferably kept to a low value. The light weight lever assembly supported on the bushing 400 by the cooperation of the arm knife edges 450 in the V-cuts 426 together with the small annular contact of the seal disc 452 on rod 436 and adjacent the knife edged aperture 408 results in negligible friction between the lever assembly 224 and bushing 400.

Bushing 400, lever actuator 430 and small diameter rod 426 are made from hardened metal to prevent wear. If desired, hardening of the bushing 400 and actuator 436 can be localized to the immediate knife-edged portions and the V-cut areas engaged by the actuator knife edges.

The end of the lever actuator 430 opposite knife arms 432 has a flat upper surface 462 constituting a horizontal platform substantially coplanar with the axis of rod 436. A pin hole 464 in the horizontal platform surface 462 diverges into a larger diameter hole 466 in the underside of actuator 430. Pin hole 464 is substantially vertically aligned with the axis of and below the diaphragm socket 350 when lever assembly 224 is horizontally situated and secured in base section 228. A push rod link 470 with an upper conical end 472 situated in the diaphragm socket 350 has a lower rounded end 474 resting on the horizontal platform surface 462. A pin 476 in and extending downwardly from the center of the round push rod end 474 projects through the platform pin hole 464 to retain the push rod on the actuator platform yet permitting the slight rocking movements which occur when the diaphragm assembly 222 shifts up or down.

In all embodiments the pivot axis of the lever retainer, the knife edge of the bushing aperture and the primary seal area around the lever rod are disposed in essentially the same plane so there are negligible changes in resistance moments as the lever rocks on its pivot axis.

The foregoing description discloses new diaphragm and diaphragm chamber cooperative structure, new lever, fulcrum and seal structures to transfer rocking motion from the inside of a pressure chamber to the outside. Lever fulcrum structures and a highly effective annular knife edge aperture and cooperative pressure seal are combined to reduce pivot bearing and seal friction losses to a minimum and to provide a sensitive structure with little or no leakage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure measuring device: a casing; a flexible diaphragm disposed in said casing and forming with said casing separate chambers on opposite sides of said diaphragm; said diaphragm having an annular generally U-section formed inwardly of the periphery thereof opening into the one of said chambers normally containing fluid under higher pressure than the other chamber; a diaphragm thrust member secured to said diaphragm inwardly of said annular U-section freely floating within said casing for movement with the diaphragm in response to pressure differentials between the chambers at opposite sides thereof; resilient means effectively opposing movement of said diaphragm from zero position; means in the wall of said casing providing a circumferential knife edge forming an aperture through said wall; a lever member projecting through said aperture with a close free fit; pivot means fixed to said lever member on one side of said wall; pivot retaining means cooperating between said wall and said pivot means to maintain said lever member in position; seal means providing a pressure seal between said lever member and said wall; and means within said casing coupling said lever member and said diaphragm thrust member for conjoint movement.

2. Mechanism for transmitting rocking motion through the wall of a casing adapted to contain fluid under pressure comprising: means providing an axially narrow annular aperture in the wall of said casing, a rigid rod projecting through said aperture with a close free fit permitting limited tilting of said rod at said aperture, means within said casing secured to said rod and having bearing engagement with said casing adjacent said aperture for rocking about an axis diametrically of said aperture, and resilient seal means fitting about said rod and engaging the casing wall around said aperture, said seal means being exposed to internal pressure in said casing which urges said seal means into tight engagement with said casing and rod.

3. Mechanism as defined in claim 2, wherein said means secured to said rod is disposed relative to the axially narrow aperture so its rocking axis is in substantially the same plane that contains said axially narrow aperture.

4. Mechanism for transmitting rocking motion through the wall of a casing adapted to contain fluid under pressure comprising: means providing an axially narrow annular aperture in the wall of said casing, a rigid rod projecting through said aperture with a close substantially line contact fit permitting limited tilting of said rod at said aperture, means within said casing secured to said rod and having bearing engagement with said casing adjacent said aperture for rocking about an axis transversely of said aperture, and resilient seal means fitting about said rod and engaging the casing wall around said aperture, said seal means being exposed to internal pressure in said casing which urges said seal means into tight engagement with said casing and rod.

5. Mechanism as defined in claim 4, wherein said means secured to said rod provides a substantially line contact bearing engagement with said casing on an axis normal to the rod axis.

6. Mechanism as defined in claim 5, wherein said means secured to said rod is disposed relative to the axially narrow aperture so the line contact bearing engagement is in substantially the same plane that contains said axially narrow aperture.

7. A device for transmitting motion through a pressure tight wall comprising an annular substantially knife-edged aperture in said wall; a lever passing with a close free fit through said aperture; a member rigid on said lever with a substantially knife-edged pivot transverse to the lever longitudinal axis and abutting the high pressure side of said wall, the knife-edged pivotal axis lying in a plane substantially inclusive of the annular knife edge of said aperture; and a seal means between said lever and said wall subjected to the high pressure to thereby provide a pressure seal.

8. A sealed lever for transferring rocking motion from one side of a wall to the other side of the wall comprising: means providing a circumferential knife edge forming an aperture through said wall; a lever member projecting through said aperture with a close free fit; pivot means fixed to said lever member on one side of said wall; pivot retaining means cooperating between said wall and said pivot means to maintain said lever member in position; and seal means providing a pressure seal between said lever member and said wall.

9. A device for transmitting motion between a high and low pressure side of a wall member comprising: an annular knife edged aperture formed in said wall, a circular cross section lever passing with a close free fit through said aperture, means on the ends of said lever providing pivotal attachment to a driving and a driven element and including pivot means transverse to the lever longitudinal axis disposed on the high pressure side of said wall, the pivotal axis lying in a plane substantially inclusive of the annular knife edge of said aperture, and a seal means between said lever and said wall subjected to the high pressure to thereby provide a pressure seal.

10. A sealed lever for transferring rocking motion from one side of a wall to the other side of the wall comprising: means providing a circumferential knife edge forming an aperture through said wall; a lever member projecting through said aperture with a close free fit; knife-edged pivot means fixed to said lever member on one side of said wall; abutment means on said one side of said wall in close proximity to said circumferential knife edge and engaged by said knife-edged pivot means; means cooperating between said wall and said pivot means to maintain said pivot means in abutment with said abutment means; and seal means providing a pressure seal between said lever member and said wall.

11. Sealed structure for use in transmitting motion from one side to the other of a pressure tight wall comprising: a bushing having a through passage larger at one end than at the other end with the wall of said passage tapered at least adjacent its small end to provide a knife-edged opening, a lever member projecting through said bushing and having a dimension to provide a close free fit with said knife-edged opening, a retainer member on said lever member in pivotal engagement with said bushing, means maintaining said retainer member and bushing in relative pivotal engagement, and seal means between said lever member and said bushing.

12. Sealed structure for use in transmitting motion from one side to the other of a pressure tight wall comprising: a bushing having a through passage larger at one end than at the other end with the wall of said passage tapered at least adjacent its small end to provide a knife-edged opening, a lever member projecting through said bushing and having a dimension to provide a close free fit with said knife-edged opening, a knife-edged member on said lever member in pivotal engagement with said bushing, means maintaining said knife-edged member and bushing in relative pivotal engagement, and seal means between said lever member and said bushing.

13. A sealed lever for transferring rocking motion from one side of a wall to the other side of the wall comprising: means providing a circumferential knife edge forming an aperture through said wall; a circular rod projecting through said aperture with a close free fit; a member having spaced arms providing knife-edged pivot means fixed to said rod on one side of said wall with said knife-edged pivot means being aligned and transversely disposed on a line intersecting the longitudinal axis of said rod; abutment means on said one side of said wall in close proximity to said circumferential knife edge and engaged by said knife-edged pivot means; ear members on said one side of said wall cooperating with the spaced arms of said pivot member to maintain said pivot means in abutment with said abutment means; and seal means providing a pressure seal between said rod and said wall.

14. Sealed structure for use in transmitting motion from one side to the other of a pressure tight wall comprising: a bushing having a through passage larger at one end than at the other end with the wall of said passage tapered at least adjacent its small end to provide an annular knife-edged opening, a lever member projecting through said bushing and having a dimension to provide a close free fit with said annular knife-edged opening, means on said lever member in pivotal engagement with said bushing, and a semi O-ring seal means retained on the bushing end face around said lever and in sealing engagement with said lever approximately in a plane coextensive with said annular knife-edged opening.

15. For use in combination with a pressure vessel having a wall with a hole therein, a sealed lever assembly for transmitting motion between the inside and outside of the chamber comprising: a member adapted to be fixed in the pressure chamber hole and having a passage therethrough, one end of which terminates in an annular aperture that is substantially knife-edged; a shaft through said passage having a close free fit relative to said annular aperture; and means including said annular aperture and a straight knife edge providing a rocking pivot and seal for said shaft with said pivot and a portion of said seal being substantially coplanar with said annular aperture.

16. For use in combination with a pressure vessel having an opening in one of its walls; a rocking lever assembly comprising a bushing adapted to fit in fluid tight relation in the pressure vessel opening, said bushing having an open end and an end wall with an aperture therethrough at its other end to provide a through passage coextensive with said open end, a portion of the inner side of said end wall surrounding said aperture being formed to provide a substantially knife-shaped edge circumscribing said aperture and said end wall being exposed to the interior of said pressure vessel when the bushing is fixed thereto; a rod projecting through said bushing passage and having a cross section dimension providing a close but free fit within the aperture; pivot means fixed to said rod and adapted to be disposed inside said pressure vessel and in engagement with said bushing; and seal means on said bushing surrounding said rod to provide a fluid tight pressure seal between said rod and bushing.

17. For use in combination with a pressure vessel having an opening in one of its walls; a rocking lever assembly comprising a bushing adapted to fit in fluid tight relation in the pressure vessel opening, said bushing having one end open and the other end provided with an end wall having an aperture therethrough to provide a through passage coextensive with said open end, a portion of the inner side of said end wall being formed to provide a substantially knife-shaped edge circumscribing said aperture and the outer surface of said end wall being exposed to the interior of said pressure vessel when said bushing is fixed thereto; a rod projecting through said bushing passage and having a cross section dimension providing a close but free fit within the aperture; a pivot member having dependent members terminating in knife edges fixed to said rod and adapted to be disposed inside said pressure vessel with said knife edges abutting said outer surface of said bushing end wall; means including the knife edge portion of said pivot member and retaining means on said bushing structurally cooperating to maintain said knife-edged member and bushing in pivotal engagement; and flexible seal means on said bushing surrounding said rod to provide a fluid tight pressure seal between said rod and bushing.

18. For use in combination with a differential pressure measuring vessel, a motion transmitting, pressure-sealed, rocking lever assembly passing through the orifice meter wall, comprising: a hardened metal insert adapted to be sealingly retained in a hole in the vessel wall, the end face of said insert to be disposed interior of the orifice meter lying in a plane normal to the axis of said hole, a longitudinal passage through said insert having a tapered portion thereof with its small diameter end adjacent the end face of said insert to thereby provide an annular knife edge substantially coextensive with the plane of said end face; a small diameter round hardened metal rod having a diametral dimension that enables a close free fit in the small diameter end of said insert passage projected through said insert passage; means fixed to the portion of said rod which extends from said small diameter opening of said insert passage to provide a pivot axis normal to the axis of said rod and maintaining said metal rod in pivotal disposition relative to said insert; and means on said insert end face providing a pressure tight seal between said insert and said rod.

19. For use in combination with a chambered pressure measuring device having at least a motion transmitting, pressure-sealed, rocking lever assembly passing through the wall of the chambered measuring device, comprising: a hardened metal bushing adapted to be sealingly retained in a hole in the wall of the chambered measuring device, the end face of said bushing to be disposed interior of the chambered measuring device lying in a plane normal to the axis of said bushing, a longitudinal passage through said bushing having a tapered portion thereof with its small diameter end adjacent the end face of said bushing to thereby provide an annular knife edge substantially coextensive with the plane of said end face; a round, small diameter hardened metal rod having a diametral dimension that enables a close free fit in the small diameter end of said bushing passage projected through said bushing passage; pivot means rigid with the portion of said rod which extends from said small diameter opening of said bushing passage providing a pivot axis normal to and intersecting the axis of said rod and axially maintaining said metal rod relative to said bushing; and a seal means comprising an elastomeric thin disc sealingly clamped on said bushing end face and a thin integral collar extending from said bushing end face around said rod providing a pressure tight seal between said bushing and said rod.

20. For use in combination with a pressure measuring device: a diaphragm means having a rigid central thrust member with an axial projection, said axial projection being externally threaded and having a coaxial blind bore; a lever retainer adapted to be fixed to the inner end of a motion transmitting lever that projects through a wall of the pressure measuring device; said lever retainer including an externally threaded projection having a coaxial blind bore; a rigid elongated link extending between said two projections and having its ends disposed in said blind bores; and a tension spring extending between and having its ends engaged over said threaded projections.

21. A pressure measuring device comprising: a pressure chamber; a diaphragm device dividing said pressure chamber into two isolated compartments; said diaphragm device including a thrust member and a diaphragm means at one side of said diaphragm device for transmitting movements of said thrust member to the exterior of said pressure chamber including a motion transmitting lever structure projecting in fluid tight relationship through a wall of said pressure chamber with means providing a fluid seal and an essentially friction-free knife edge pivotal rocking connection between said lever structure and said wall which maintains an essentially constant high sensitivity of motion transmission, said means including means in said wall comprising a knife edge orifice through which said lever structure projects, a seal means engaging the interior edge of said orifice and the portion of lever structure which is adjacent said orifice, a knife edge pivot means on said lever structure, and an abutment means adjacent said orifice and interior of said pressure chamber pivotally engaged by said knife edge pivot means.

22. A pressure measuring device as defined in claim 21, wherein an adjustable resilient device is disposed in one of said compartments and connects between said thrust member and said pressure chamber.

23. A pressure measuring device as defined in claim 21, wherein a resilient coupling connects said thrust member and said lever structure.

24. A pressure measuring device as defined in claim 21, wherein independent inlets are provided to each of said isolated compartments, an intermediate rigid barrier structurally separate from said chamber with a throttling orifice is disposed in said chamber between one of said inlets and said diaphragm device, and seal means are included between said barrier and said chamber to provide a sealed preliminary inlet compartment.

25. A pressure measuring device as defined in claim 21, wherein said thrust member is disc-shaped and is axially disposed between two closely spaced, rigidly maintained, annular shoulders adapted to be engaged by said diaphragm device and to provide maximum limits of movement of said diaphragm device.

26. Sealed structure for use in transmitting motion from one side to the other of a pressure tight wall comprising: a bushing having a through passage larger at one end than at the other end with the wall of said passage tapered at least adjacent its small end to provide a knife-edged opening; a circular rod constituting a lever member projecting through said bushing and having a dimenison to provide a close free fit with said knife-edged opening; a retainer member on said lever member in pivotal engagement with said bushing, said retainer member having two spaced pivot arms disposed at the sides of said lever member, the pivot axes of said two arms being aligned and transversely disposed on a line intersecting the longitudinal axis of said lever member; means maintaining said retainer member and bushing in relative pivotal engagement; and seal means between said lever member and said bushing.

27. Sealed structure for use in transmitting motion from one side to the other of a pressure tight wall comprising: a bushing having a through passage larger at one end than at the other end with the wall of said passage tapered at least adjacent its small end to provide a knife-edged opening, a circular rod constituting a lever member projecting through said bushing and having a dimension to provide a close free fit with said knife-edged opening, a knife-edged member on said lever member in pivotal engagement with said bushing, said knife-edged pivot member having two spaced arms with knife-edged ends disposed at the sides of said lever member, the knife edges of said two arms being aligned and transversely disposed on a line intersecting the longitudinal axis of said lever member, means maintaining said knife-edged member and bushing in relative pivotal engagement, and seal means between said lever member and said bushing.

28. A pressure measuring device comprising: a pressure chamber; a diaphragm device dividing said pressure chamber into two isolated compartments; said diaphragm device including a thrust member and a diaphragm with wall means enabling the net effective area of the diaphragm to remain constant throughout the range of movement of said diaphragm device; means at one side of said diaphragm device for transmitting movements of said thrust member to the exterior of said pressure chamber including a motion transmitting lever structure projecting in fluid tight relationship through a wall of said pressure chamber with means providing a fluid seal and an essentially friction-free pivotal rocking connection between said lever structure and said wall which maintains an essentially constant high sensitivity of motion transmission; said lever structure and said means providing a fluid seal and a pivotal rocking connection between said lever structure and said wall comprising an annular substantially knife-edged aperture in said wall, a lever passing with a close free fit through said aperture, a member rigid on said lever with a substantially knife-edged pivot transverse to the lever longitudinal axis and abutting the high pressure side of said wall, the knife edge pivotal axis lying in a plane substantially inclusive of the annular knife edge of said aperture, and a seal means between said lever and wall subjected to the high pressure to thereby provide a pressure seal.

29. In a pressure measuring device as defined in claim 28, said seal means being an annular thin wall elastic device disposed around and in engagement with said lever on the interior side of said pressure chamber and maintained against a portion of said wall surrounding and including said knife-edged aperture.

30. A pressure measuring device comprising: a sectional casing; a flexible diaphragm disposed between sections of said casing and forming, with said casing, separate chambers on opposite sides of said diaphragm; a diaphragm thrust member secured to said diaphragm within said casing for movement with the diaphragm in response to pressure differentials between the chambers at opposite sides thereof; a resilient biasing assembly connected to said thrust member and having a base member releasably secured to the interior of said casing, said biasing assembly yieldingly opposing movement of said diaphragm from zero position; means in the wall of said casing providing an aperture through said wall; a lever member projecting through and adapted to fulcrum at said aperture and having one end disposed between said thrust member and said base member; and a push link means within said casing coupling said one end of said lever member and said diaphragm thrust member; said diaphragm, said thrust member and said resilient biasing assembly being a removable unit.

31. A pressure measuring device comprising: a casing with plural chambered sections; means releasably securing said sections together in stacked relationship; at least one flexible diaphragm disposed between and having its outer periphery clamped between adjacent sections of said casing and forming, with said chambered sections, isolated separate chambers on opposite sides of said diaphragm; the outer periphery of said diaphragm being formed as an annular bead; continuous matching groove means in the joinder surfaces of said adjacent sections receiving and sealingly clamping said beaded diaphragm periphery; said diaphragm having an annular generally U-section formed radially inwardly of the periphery thereof opening into the one of said chambers normally containing fluid under higher pressure than the other chamber; a rigid diaphragm carrier member secured to said diaphragm radially inwardly of said annular U-section within said casing for movement with the diaphragm in response to pressure differentials between the chambers at opposite sides thereof; resilient means secured to said carrier, including a base section spaced from said carrier, for biasing said diaphragm to zero position; releasable means securing said base section to one of said adjacent sections; means in the wall of said casing providing a circumferential knife edge forming an aperture through said wall; a lever member projecting through said aperture with a close free fit; pivot means fixed to said lever member on one side of said wall; pivot retaining means cooperating between said wall and said pivot means to maintain said lever member in pivotal position; seal means providing a pressure seal between said lever member and said wall; and substantially friction-free connecting means within said casing coupling said lever member and said diaphragm carrier for conjoint movement.

32. A pressure measuring device comprising: a casing; a flexible diaphragm disposed in said casing and forming with said casing separate chambers on opposite sides of said diaphragm; a diaphragm thrust member secured to said diaphragm within said casing for movement with the diaphragm in response to pressure differentials between the chambers at opposite sides thereof; passage means for introducing fluid under pressure into said chambers; a diaphragm biasing means connected to said thrust member and having a rigid base member releasably secured to the interior of said casing, said biasing assembly effectively opposing movement of said diaphragm from zero position; means in the wall of said casing providing a circumferential knife edge forming an aperture through said wall; a lever member projecting through said aperture with a close free fit; pivot means fixed to said lever member on one side of said wall; pivot retaining means cooperating between said wall and said pivot means to maintain said lever member in position; seal means providing a pressure seal between said lever member and said wall; and a push link means within said casing coupling said lever member and said diaphragm thrust member.

33. In a pressure measuring device: a casing; a flexible diaphragm disposed in said casing and forming with said casing separate chambers on opposite sides of said diaphragm; a rigid diaphragm thrust member centrally secured to said diaphragm within said casing for movement with the diaphragm in response to pressure differentials between the chambers at opposite sides thereof and having a tapered bottom blind socket in its free end; a resilient biasing assembly connected to said thrust member and having a base member releasably secured to the interior of said chamber, said biasing assembly yieldingly opposing movement of said diaphragm from zero position; sealed structure in the wall of said casing for transmitting motion from one side to the other of the pressure tight casing wall comprising: a bushing having a through passage larger at one end than at the other end with the wall of said passage tapered at least adjacent its small end to provide a knife-edged opening, a circular rod constituting a lever member projecting through said bushing and having a dimension to provide a close free fit with said knife-edged opening, a knife-edged member on said lever member in pivotal engagement with said bushing, said knife-edged pivot member having two spaced arms with knife-edged ends disposed at the sides of said lever member, the knife edges of said two arms being aligned and transversely disposed on a line intersecting the longitudinal axis of said lever member, means including V-cuts in the end of said bushing, the bottom edges of which are diametrical to said knife-edged opening and in the plane of said knife-edged opening, and a biasing spring maintaining said knife-edged member and bushing in relative pivotal engagement, and seal means between said lever member and said bushing; and a rigid elongate link carried by said knife-edged member and having a tapered end.

34. Sealed structure for use in transmitting motion from one side to the other of a pressure tight wall comprising: a bushing having a through passage larger at one end than at the other end with the wall of said passage tapered at least adjacent its small end to provide a knife-edged opening, a circular rod constituting a lever member projecting through said bushing and having a dimension to provide a close free fit with said knife-edged opening, a knife-edged member on said lever member in pivotal engagement with said bushing, said knife-edged pivot member having two spaced arms with knife-edged ends disposed at the sides of said lever member, the knife edges of said two arms being aligned and transversely disposed on a line intersecting the longitudinal axis of said lever member, including V-cuts in the end of said bushing the bottom edges of which are diametrical to said knife-edged opening and in the plane of said knife-edged opening, and a biasing spring maintaining said knife-edged member and bushing in relative pivotal engagement, and seal means between said lever member and said bushing.

35. In the motion transmitting structure defined in claim 34, said seal means consists of a thin rubber-like apertured disc snugly surrounding said rod and disposed against the pressure side of said bushing adjacent said opening and a light compression spring between said disc and said knife-edged member to hold said disc against said bushing.

36. For use in combination with a chambered pressure measuring device, a motion transmitting, pressure sealed, rocking lever assembly passing through the wall of the chambered measuring device, comprising: a hardened metal bushing adapted to be sealingly retained in a hole in the wall of the chambered measuring device, the end face of said bushing, to be disposed interior of the chambered measuring device, lying in a plane normal to the axis of said bushing, a longitudinal passage through said bushing having a tapered portion thereof with its small diameter end adjacent the end face of said bushing to thereby provide an annular knife edge substantially coextensive with the plane of said end face; a round, small diameter hardened metal rod having a diametral dimension that enables a close free fit in the small diameter end of said bushing passage, projected through said bushing passage; an annular rim on said end face axially projecting away from the main body of said bushing and having diametrically disposed horizontally directed V-cuts, the bottoms of which are aligned and in the plane of said end face and intersect the axis of said rod; means rigid on the portion of said rod projecting from said bushing end face providing a pivot device with two spaced apart knife-shaped arms, the edges of which are diametrically aligned normal to the axis of said rod and rest in said V-cuts of said bushings; means connecting between said bushing and said rod retaining said knife edges against the bottom edge of said V-cuts; and a seal means extending from said bushing end face around said rod providing a pressure tight seal between said bushing and said rod.

37. Sealed structure for use in transmitting motion from one side to the other of a pressure tight wall comprising: a bushing having a through passage larger at one end than at the other end with the wall of said passage tapered at least adjacent its small end to provide a knife-edged opening, a circular rod constituting a lever member projecting through said bushing and having a dimension to provide a close free fit with said knife-edged opening, and seal means between said lever and said opening.

38. In a flexible link adapted to transmit linear motion, the combination of a first member, a second member, a tension spring adapted to connect the first and second members, a pin mounted between said first and second members and being disposed in the same general direction as said members, a joint connecting the pin and one of said members, said joint comprising means defining a recess, means defining a surface having substantially the same geometric contour as the recess, the contour of the recess being substantially larger than the contour of the surface whereby only a small portion of the contour of the surface engages the contour of the recess.

39. The link according to claim 38 in which the recess has a conical shape.

40. In a flexible link adapted to transmit linear motion, the combination of a first member, a second member, a plurality of threads on each member, a tension spring adapted to threadably engage said threads on said members to bias said members toward one another, a pin operatively associated with said members to restrain the bias on said members, each of said members having a recess, means associated with at least one end of said pin which extends into the recess, said means having substantially the same geometric contour as the recess, the contour of the recess being substantially larger than the contour of the means whereby only a small portion of the contour of the means engages the contour of the recess.

41. The link according to claim 40 in which the means has a shape of a cone.

42. The link according to claim 41 in which the cone is a portion of the pin.

43. A flexible link comprising: a first means including an externally threaded projection and having a coaxial blind bore; a second means including an externally threaded projection having a coaxial blind bore; a rigid elongate link extending between said two projections and having its ends disposed in said blind bores; and a tension spring extending between and having its ends engaged over said threaded projections.

References Cited by the Examiner

UNITED STATES PATENTS

| 1,992,048 | 2/35  | Temple  | 74—18.1 |
| 2,138,937 | 12/38 | Petroe  | 74—18.1 |
| 2,643,887 | 6/53  | Andres  | 308—2   |
| 2,702,728 | 2/55  | Lindner | 308—2   |
| 2,723,165 | 11/55 | Hess    | 308—2   |
| 2,737,973 | 3/56  | Kimmell | 74—18.1 |

FOREIGN PATENTS 512,574   9/39   Great Britain.

References Cited by the Applicant

UNITED STATES PATENTS

| 2,781,665 | 2/57 | Yao. |
| 2,826,919 | 3/58 | Klinger. |
| 2,883,998 | 4/59 | Broughton. |

RICHARD B. WILKINSON, *Primary Examiner.*

EMILE PAUL, MILTON BUCHLER, *Examiners.*